US008361937B2

(12) United States Patent
Cassidy et al.

(10) Patent No.: US 8,361,937 B2
(45) Date of Patent: Jan. 29, 2013

(54) CORROSION INHIBITOR COMPOSITIONS COMPRISING REACTION PRODUCTS OF ALDEHYDES AND AMIDES AND RELATED METHODS (75) Inventors: Juanita M. Cassidy, Duncan, OK (US); Chad E. Kiser, Comanche, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 317 days.

(21) Appl. No.: 12/958,036

(22) Filed: Dec. 1, 2010

(65) Prior Publication Data
US 2012/0142563 A1 Jun. 7, 2012

(51) Int. Cl.
*C23G 1/06* (2006.01)

(52) U.S. Cl. .................................. 507/249; 166/305.1

(58) Field of Classification Search .................. 507/249; 166/305.1
See application file for complete search history.

(56) References Cited

U.S. PATENT DOCUMENTS

| 3,077,454 | A | * | 2/1963 | Monroe et al. | ................ 507/244 |
| 3,094,490 | A | * | 6/1963 | Gardner et al. | ............... 252/391 |
| 3,600,321 | A | | 8/1971 | Tedeschi et al. | |
| 3,779,935 | A | | 12/1973 | McDougall et al. | |
| 3,932,296 | A | * | 1/1976 | Byth | .............................. 507/240 |
| 4,921,992 | A | * | 5/1990 | Adams et al. | ................. 558/145 |
| 5,366,643 | A | * | 11/1994 | Walker | .......................... 507/247 |
| 5,591,381 | A | | 1/1997 | Walker | |
| 5,697,443 | A | | 12/1997 | Brezinski et al. | |
| 2005/0123437 | A1 | * | 6/2005 | Cassidy et al. | ................. 422/12 |
| 2008/0146464 | A1 | | 6/2008 | Malwitz | |

FOREIGN PATENT DOCUMENTS

WO  WO 2006/136262 A1  12/2006
WO  WO 2008/110789 A1  9/2008

OTHER PUBLICATIONS

M. N. Desai, et al, Schiff bases as corrosoin inhibitors for mild steel in hydrochloric acid solutions, Corrsion Science, vol. 26, No. 10, pp. 827-837, 1986.*
International Search Report and Written Opinion for PCT/GB2011/001674 dated Feb. 24, 2012.

* cited by examiner

*Primary Examiner* — Alicia Toscano
(74) *Attorney, Agent, or Firm* — Robert A. Kent; McDermott Will & Emery LLP (57) ABSTRACT The invention relates to corrosion inhibitor compositions comprising products of a reaction between aldehydes and amides for use in subterranean applications and methods related thereto. In general, the methods for inhibiting corrosion comprise providing a corrosive environment and adding a composition comprising a corrosion inhibitor to the corrosive environment. The corrosion inhibitor comprises a product of a reaction between at least one aldehyde and at least one amide that is not formamide or a formamide derivative.

18 Claims, 3 Drawing Sheets

CORROSION INHIBITOR COMPOSITIONS COMPRISING REACTION PRODUCTS OF ALDEHYDES AND AMIDES AND RELATED METHODS

BACKGROUND

The present invention relates to corrosion inhibition in subterranean applications, and, more particularly, to corrosion inhibitor compositions comprising products of a reaction between aldehydes and amides and methods related thereto.

The corrosion of metal surfaces occurs when the metal surfaces are contacted by a corrosive environment containing an oxidizer (e.g., an electrochemical oxidizer, a chemical oxidizer or the like). Illustrative corrosive environments include, for example, acidic environments, environments containing water vapor in the presence of air and/or oxygen, and environments containing chloride or bromide ions, carbon dioxide and/or hydrogen sulfide. As used herein, the term "corrosion" refers to any reaction between a material and its environment that causes some deterioration of the material or its properties. Examples of common types of corrosion include, but are not limited to, the rusting of a metal, the dissolution of a metal in acids, and patina development on the surface of a metal.

Acidic environments can be produced by acidic treatment fluids that are commonly used in a number of operations in the oil and chemical industries. In such operations, any metal surfaces present are subjected to the corrosive environment of the treatment fluid. For example, metal surfaces (e.g., piping, tubular goods, heat exchangers and reactors) can be exposed to acidic treatment fluids in industrial chemical equipment. In subterranean applications, metal surfaces on various types of equipment are often exposed to corrosive conditions during downhole operations. For example, acidic treatment fluids are frequently utilized in the treatment of subterranean formations, and additional corrosive components including brine, carbon dioxide and/or hydrogen sulfide are commonly encountered downhole.

Acidic treatment fluids for downhole use include, for example, acidic clean-up fluids and stimulation fluids. Acidic stimulation fluids include, for example, treatment fluids used in hydraulic fracturing or matrix acidizing treatments. As used herein, the term "treatment fluid" refers to any fluid used in a subterranean application in conjunction with a desired function and/or for a desired purpose. The term "treatment fluid" does not imply any particular action by the fluid or any component thereof. Acidic treatment fluids can include a variety of acids such as, for example, hydrochloric acid, formic acid, hydrofluoric acid, and the like.

While acidic treatment fluids are useful for a variety of downhole operations, they can be somewhat problematic due to potential metal surface corrosion on downhole production tubing and tools, for which the repair or replacement costs are high. Furthermore, under typical downhole conditions, corrosion rates of metal surfaces are frequently increased due to elevated temperatures and pressures that are present in the subterranean environment. In addition to damage caused to downhole metal surfaces, corrosion can result in significant quantities of the acidic treatment fluid being neutralized, thereby reducing the treatment fluid's downhole effectiveness.

To combat potential corrosion problems, various corrosion inhibitors have been used to reduce or substantially prevent corrosion of metal and metal alloy surface on downhole equipment, all with varying levels of success. As used herein, the term "inhibit" and its derivatives refer to a lessening of the tendency of a phenomenon to occur and/or the degree to which that phenomenon occurs. The term "inhibit" does not imply any particular degree or amount of inhibition. Corrosion inhibitor compositions frequently include an aldehyde as the corrosion inhibiting component. A difficulty encountered with some common corrosion inhibitors is the limited temperature range over which they can function effectively. Another frequently encountered difficulty of common corrosion inhibitors is their unsatisfactory performance under highly acidic conditions. Under either or both of these conditions, an unacceptably high rate of corrosion can occur. Further, a number of common corrosion inhibitors have health, safety and/or environmental considerations that can geographically limit where they are able to be utilized. In the present invention, improved corrosion inhibitor compositions and various methods related thereto are described which address some of the foregoing considerations.

SUMMARY OF THE INVENTION

The present invention relates to corrosion inhibition in subterranean applications, and, more particularly, to corrosion inhibitor compositions comprising products of a reaction between aldehydes and amides and methods related thereto.

In some embodiments, the present invention describes a method comprising: providing a corrosive environment; and adding a composition comprising a corrosion inhibitor to the corrosive environment; wherein the corrosion inhibitor comprises a product of a reaction between at least one aldehyde and at least one amide that is not formamide or a formamide derivative.

In some embodiments, the present invention describes a method comprising: providing a corrosive environment having a pH of less than about 5; adding a composition comprising at least one aldehyde precursor and at least one amide to the corrosive environment; wherein the at least one amide is not formamide or a formamide derivative; and wherein the at least one aldehyde precursor forms at least one aldehyde in the corrosive environment; reacting the at least one aldehyde and the at least one amide in the corrosive environment to form a product that inhibits corrosion; and exposing the product that inhibits corrosion to a metal surface in the corrosive environment.

In some embodiments, the present invention describes a method comprising: providing a corrosive environment having a pH of less than about 5; adding a composition comprising at least one aldehyde and at least one amide to the corrosive environment; wherein the at least one amide is not formamide or a formamide derivative; reacting the at least one aldehyde and the at least one amide in the corrosive environment to form a product that inhibits corrosion; and exposing the product that inhibits corrosion to a metal surface in the corrosive environment.

In some embodiments, the present invention describes a method comprising: providing a corrosive environment having a pH of less than about 5; and adding a composition comprising a corrosion inhibitor to the corrosive environment; wherein the corrosion inhibitor comprises a product of a reaction between at least one aldehyde and at least one urea.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to those skilled in the art and having the benefit of this disclosure.

DETAILED DESCRIPTION

The present invention relates to corrosion inhibition in subterranean applications, and, more particularly, to corrosion inhibitor compositions comprising products of a reaction between aldehydes and amides and methods related thereto.

There are many advantages of the present invention, only a few of which are discussed or alluded to herein. In general, the present invention provides compositions that offer improved corrosion inhibition over that obtainable with common corrosion inhibitors. In particular, the present invention enhances the corrosion inhibition properties of aldehyde-based corrosion inhibitors. Corrosion inhibitor compositions and related methods of the present invention utilize a product of the reaction between at least one aldehyde and at least one amide to achieve significantly improved corrosion resistance over using an aldehyde alone. The corrosion inhibitor compositions and related methods of the present invention can be effectively used over a wide temperature range to provide a desirable degree of corrosion inhibition. Further, the present corrosion inhibitor compositions are especially effective in highly acidic environments (i.e., a pH of 5 or less), thereby enhancing their versatility. In fact, in some embodiments of the present invention, acidic conditions are actually favorable for facilitating the formation of the corrosion inhibitor. Not only are the present corrosion inhibitor compositions and methods desirable from a standpoint of their corrosion-inhibiting properties under a variety of temperature and pH conditions, but they also can have a favorable health, safety and environmental profile.

There is great versatility in how the present corrosion inhibitor compositions are formed, which facilitates their implementation in the field. For example, the corrosion inhibitor compositions can be in the form of a primary corrosion inhibitor agent, where the product of a reaction between at least one aldehyde and at least one amide is preformed before being placed in a corrosive environment. Alternately, the corrosion inhibitor compositions can comprise unreacted aldehyde and amide components, which do not react with one another to form a product until being exposed to acidic conditions. In such cases, the aldehyde can be provided in either its free carbonyl state or as any aldehyde precursor which reveals the aldehyde carbonyl upon exposure to the acidic conditions. Additionally, an amide, an aldehyde or the reaction product between an amide and an aldehyde can be added as an intensifier to react in situ with another corrosion inhibitor or otherwise enhance the corrosion inhibition capabilities of another corrosion inhibitor. In some embodiments, the other corrosion inhibitor can be an aldehyde or amide.

In some embodiments, the present invention provides methods for inhibiting corrosion. In some embodiments, the methods for inhibiting corrosion comprise providing a corrosive environment and adding a composition comprising a corrosion inhibitor that comprises a product of a reaction between at least one aldehyde and at least one amide that is not formamide or a formamide derivative to the corrosive environment.

In some embodiments, the methods for inhibiting corrosion comprise providing a corrosive environment having a pH of less than about 5, adding a composition comprising a corrosion inhibitor that comprises a product of a reaction between at least one aldehyde and at least one amide that is not formamide or a formamide derivative to the corrosive environment, and exposing a product that inhibits corrosion to a metal surface in the corrosive environment. In the corrosive environment, the at least one aldehyde precursor forms at least one aldehyde that subsequently reacts with the at least one amide to form a product that is at least capable of inhibiting corrosion.

In some embodiments, the methods for inhibiting corrosion comprise providing a corrosive environment having a pH of less than about 5, adding a composition comprising at least one aldehyde and at least one amide that is not formamide or a formamide derivative to the corrosive environment, allowing the at least one aldehyde and the at least one amide to react in the corrosive environment to form a product that inhibits corrosion, and exposing the product that inhibits corrosion to a metal surface in the corrosive environment.

In some embodiments, the methods for inhibiting corrosion comprise providing a corrosive environment having a pH of less than about 5 and adding a composition comprising a corrosion inhibitor to the corrosive environment, where the corrosion inhibitor comprises a product of a reaction between at least one aldehyde and at least one urea.

In some embodiments, the present invention provides a corrosion inhibitor composition. The composition comprises an acidic base fluid and a product of a reaction between at least one aldehyde and at least one amide that is not formamide or a formamide derivative.

The term "reaction product" or "product of a reaction" as used herein refers to a product produced from a reaction (e.g., a condensation reaction) between at least one aldehyde and at least one amide or urea. In some embodiments, the product of a reaction between at least one aldehyde and at least one amide is an alkylolamide or a arylolamide. Such reaction products are generally produced by reacting about a 1:1 molar ratio of aldehyde to amide. In some embodiments, the product of a reaction between at least one aldehyde and at least one amide can include an alkylidene bisamide or arylidene bisamide. Such reaction products are generally produced by reacting about a 1:2 molar ratio of aldehyde to amide. Such products of a reaction between at least one aldehyde and at least one amide are shown in Scheme 1 below, where $R_1$ and $R_2$ are the same or different and selected from alkyl, trihaloalkyl, alkenyl, alkynyl, aryl, aralkyl, cycloalkyl, heterocyclyl, or heteroaryl. These groups can be straight chain or branched and can also contain heteroatom functionality in the main chain or as a side chain appendage. Heteroatoms include, for example, O, N, S, F, Cl, Br and I. Further details of the reaction between aldehydes and amides can be found in ORGANIC REACTIONS, Eds. A. Cope, et al., Vol. 14, John Wiley & Sons, p. 92, 1965.

Scheme 1

While not wishing to be limited by any theory or mechanism, it is believed that the product of a reaction between at least one aldehyde and at least one amide provides improved corrosion resistance over that achievable with the aldehyde alone. Further, it is believed that the reaction between at least one aldehyde and at least one amide provides a highly prolific source of products that may themselves inhibit corrosion or react further to inhibit corrosion in highly acidic environments.

Although the reaction between at least one aldehyde and at least one amide can occur over a broad pH range from <1 to 12 or greater, the reaction product is preferably formed under acidic conditions. In more preferred embodiments, the product of a reaction between at least one aldehyde and at least one amide is formed under acidic conditions, such as, for example, a pH of about 5 or less. This feature allows the present corrosion inhibitor compositions to be formed in situ in an acidic treatment fluid. In some embodiments, the reaction product is formed at a pH of about 1 or less. Such acidic conditions are commonly found in mineral acid solutions (e.g., hydrochloric acid). In other embodiments, the reaction product is formed at a pH of about 5 or less. Such acidic conditions are commonly found in organic acid solutions including, for example, formic acid, acetic acid, propionic acid, chloroacetic acid, trichloroacetic acid, and benzoic acid. One of ordinary skill in the art will recognize that there are other conditions that may be suitable for reacting at least one aldehyde with at least one amide to form a reaction product comprising a corrosion inhibitor composition, and the conditions discussed herein should not be considered as limiting.

It should again be emphasized that the present invention is not intended to be limited by any particular theory or mechanism. One of ordinary skill in the art will recognize that the corrosion inhibitor compositions of the present invention can include any reaction product or mixtures of reaction products that occur in the reaction between at least one aldehyde and at least one amide, including those discussed in detail above. In addition, such reaction products may react further either during the process of their formation or during their exposure to a corrosive environment to produce a corrosion inhibitor composition having the beneficial properties discussed herein.

Again without wishing to be limited by any theory or mechanism, attributes of corrosion inhibitors that are generally thought to be beneficial include, for example, capability for heteroatom bonding to the metal surface; capability for coverage of the metal surface with aromatic rings; capability for favorable electronic attractions, including pi bonding; and capability for favorable packing dynamics to facilitate greater coverage of the molecules on the metal surface. Any or all of these properties or other features can be conveyed by the corrosion inhibitors compositions of the present invention.

As noted above, amides of the present corrosion inhibitor compositions and methods are not formamide or a formamide derivative. As used herein, the term "formamide or a formamide derivative" refers to formamide, N-substituted formamides and N,N-disubstituted formamides. One of ordinary skill in the art will recognize that formamides and formamide derivatives can liberate formic acid or formaldehyde under certain conditions.

In further embodiments of the present invention, the at least one amide comprises a primary amide or a secondary amide. In some embodiments, the at least one amide of the present invention has a structural formula of where Z is O or S, $R_3$ is alkyl, trihaloalkyl, alkenyl, alkynyl, aryl, aralkyl, cycloalkyl, heterocyclyl, heteroaryl or heteroaralkyl and $R_4$ and $R_5$ are independently hydrogen, alkyl, alkenyl, alkynyl, aryl, aralkyl, cycloalkyl, heterocyclyl, heteroaryl or heteroaralkyl, provided that at least one of $R_4$ or $R_5$ is H. These groups can be straight chain or branched and can also contain heteroatom functionality in the main chain or as a side chain appendage. Heteroatoms include, for example, O, N, S, F, Cl, Br and I. In some embodiments, the at least one amide has a structural formula of where the $R_3$, $R_4$ and $R_5$ are defined as above. In some embodiments, the at least one amide has a structural formula of where $R_3$ is defined as above. That is, in some embodiments, Z is O and $R_4$ and $R_5$ are H.

Primary and secondary amides suitable for use in the present invention can vary over a wide structural range. Illustrative examples of suitable amides include, but are not limited to, acetamide, N-methylacetamide, trichloroacetamide, N-methyltrichloroacetamide, propanamide, N-methylpropanamide, butanamide, N-methylbutanamide, pentanamide, N-methylpentanamide, hexanamide, N-methylhexanamide, benzamide, N-methylbenzamide, 1-naphthylamide, N-methyl-1-naphthylamide, 2-naphthylamide, N-methyl-2-naphthylamide, o-toluamide, N-methyl-o-toluamide, m-toluamide, N-methyl-m-toluamide, p-toluamide, N-methyl-p-toluamide, thiobenzamide, 4-pyridinethioamide, ethionamide, pyrazine-2-thiocarboxamide, nicotinamide, stearamide, 2,2-diethoxyacetamide and lauric acid amide.

In some embodiments, at least one amide has a structural formula of where $R_6$ is H, alkyl, trihaloalkyl, alkenyl, alkynyl, aryl, aralkyl, cycloalkyl, heterocyclyl, heteroaryl, heteroaralkyl, halide, alkoxy, aryloxy, nitro, amino, carboxyl, carboxamide, carbomethoxy or nitrile, and $R_7$ and $R_8$ are independently hydrogen, alkyl, alkenyl, alkynyl, aryl, aralkyl, cycloalkyl, heterocyclyl, heteroaryl or heteroaralkyl, provided that at least one of $R_7$ or $R_8$ is H. There can be up to five $R_6$, which can be the same or different and located at any of the positions in the aromatic ring. Any of $R_6$, $R_7$ or $R_8$ can be straight chain or branched and can also contain heteroatom functionality in the main chain or as a side chain appendage. Heteroatoms include, for example, O, N, S, F, Cl, Br and I. In some embodiments, the at least one amide comprises benzamide. In some embodiments, the at least one amide comprises a benzamide derivative. In some embodiments, the at least one amide comprises at least one amide selected from benzamide, benzamide derivatives, or combinations thereof.

In alternative embodiments of the present corrosion inhibitor compositions, a urea or thiourea can be substituted for the at least one amide. In such embodiments, the corrosion inhibitor compositions of the present invention can be the product of a reaction between at least one urea, substituted urea, thiourea or substituted thiourea and at least one aldehyde. In some embodiments, the urea has a structural formula of where Z is O or S, and $R_4$ and $R_5$ are independently hydrogen, alkyl, alkenyl, alkynyl, aryl, aralkyl, cycloalkyl, heterocyclyl, heteroaryl or heteroaralkyl.

Aldehydes suitable for forming a reaction product with at least one amide can vary over a wide structural range. In some embodiments of the present invention, the at least one aldehyde has a structure selected from where $R_9$ is alkyl, alkenyl, alkynyl, aryl, aralkyl, cycloalkyl, heterocyclyl, heteroaryl or heteroaralkyl and X is $(CH_2)_n$, $CH=CH$ or $C\equiv C$, where n is an integer ranging from 1 to about 10. These groups can be straight chain or branched and can also contain heteroatom functionality in the main chain or as a side chain appendage. Heteroatoms include, for example, O, N, S, F, Cl, Br and I. In more specific embodiments, the at least one aldehyde has a structure selected from where X is defined as above and $R_{10}$ is H, alkyl, trihaloalkyl, alkenyl, alkynyl, aryl, aralkyl, cycloalkyl, heterocyclyl, heteroaryl, heteroaralkyl, halide, alkoxy, aryloxy, nitro, amino, carboxyl, carboxamide, carbomethoxy or nitrile. There can be up to five $R_{10}$, which can be the same or different and located at any of the positions in the aromatic ring. $R_{10}$ can be straight chain or branched and can also contain heteroatom functionality in the main chain or as a side chain appendage.

In various embodiments, suitable aldehydes for the present invention include, for example, formaldehyde, acetaldehyde, propionaldehyde, butyraldehyde, isobutyraldehyde, valeric aldehyde, isovaleraldehyde, hexanal, heptanal, crotonaldehyde, benzaldehyde, phenylacetaldehyde, cinnamaldehyde, p-anisaldehyde, vanillin, salicylaldehyde, furfural, nicotinaldehyde, and various derivatives thereof. Examples of cinnamaldehyde derivatives suitable for use in the present invention include, but are not limited to, dicinnamaldehyde, p-hydroxycinnamaldehyde, p-methylcinnamaldehyde, p-ethylcinnamaldehyde, p-methoxycinnamaldehyde, p-dimethylaminocinnamaldehyde, p-diethylaminocinnamaldehyde, p-nitrocinnamaldehyde, o-nitrocinnamaldehyde, o-allyloxycinnamaldehyde, 4-(3-propenal)cinnamaldehyde, p-sodium sulfocinnamaldehyde, p-trimethylammoniumcinnamaldehyde sulfate, p-trimethylammoniumcinnamaldehyde o-methylsulfate, p-thiocyanocinnamaldehyde, p-(S-acetyl)thiocinnamaldehyde, p-(S—N,N-dimethylcarbamoylthio)cinnamaldehyde, p-chlorocinnamaldehyde, α-methylcinnamaldehyde, β-methylcinnamaldehyde, α-chlorocinnamaldehyde, α-bromocinnamaldehyde, α-butylcinnamaldehyde, α-amylcinnamaldehyde, α-hexylcinnamaldehyde, α-bromo-p-cyanocinnamaldehyde, α-ethyl-p-methylcinnamaldehyde, p-methyl-α-pentylcinnamaldehyde, 5-phenyl-2,4-pentadienal, 7-phenyl-2,4,6-heptatrienal, and mixtures thereof.

In some embodiments of the present invention, the at least one aldehyde comprises at least one aldehyde selected from cinnamaldehyde, crotonaldehyde, benzaldehyde, phenylacetaldehyde, derivatives thereof, and combinations thereof. In some embodiments, the at least one aldehyde is benzaldehyde. In some embodiments, the at least one aldehyde is cinnamaldehyde. In some embodiments, the at least one aldehyde is a benzaldehyde derivative. In some embodiments, the at least one aldehyde is a cinnamaldehyde derivative. In some embodiments, the at least one aldehyde comprises at least one aldehyde selected from benzaldehyde, cinnamaldehyde, derivatives thereof, or combinations thereof.

The choice of the at least one aldehyde and the at least one amide of the present corrosion inhibitor compositions can be guided by the health, safety, and environmental requirements of a particular job site. Specifically, through routine experimental selection, aldehydes and amides can be selected that have a favorable health, safety, or environmental profile, while still delivering desirable corrosion inhibition effects. One of ordinary skill in the art will be able to readily recognize particular aldehydes and amides that have favorable health, safety or environmental profiles. By way of non-limiting example, cinnamaldehyde has a favorable "yellow" ranking as per Norwegian standards for use in North Sea operations. Likewise, urea is on a listing of chemicals cited as Posing Little or No Risk to the Environment (PLONOR) as identified by the OSPAR Convention for the Protection of the Marine Environment of the North-East Atlantic.

In some embodiments, the product of the reaction between the at least one aldehyde and the at least one amide comprising the corrosion inhibitor is formed before being placed in the corrosive environment. For example, in such embodiments, the reaction product can be prepared as described herein and formulated with a treatment fluid comprising an acidic base fluid. In such cases, the reaction product can be considered to be a primary corrosion inhibitor. In such embodiments, the reaction product can optionally be combined with intensifiers including other amides, aldehydes or aldehyde precursors. In alternative embodiments, the reaction product itself can be an intensifier for another corrosion inhibitor. In addition, other additives such as, for example, hexamethylenetetramine and other formaldehyde sources can be optionally added.

In other embodiments, the product of the reaction between the at least one aldehyde and the at least one amide comprising the corrosion inhibitor is formed in the corrosive environment. For example, in such embodiments, the at least one aldehyde and the at least one amide can be added to a treatment fluid comprising an acidic base fluid. Thereafter, the at least one aldehyde and the at least one amide can react to form a reaction product comprising the corrosion inhibitor composition. The reaction between the at least one aldehyde and the at least one amide can begin substantially instantaneously upon mixing in the treatment fluid, or the commencement of the reaction between the at least one aldehyde and the at least one amide can be delayed for a period of time. In some embodiments, the reaction between the at least one aldehyde and the at least one amide can be delayed to the extent that the reaction product at least partially forms after pumping the treatment fluid downhole. Non-limiting ways for delaying the reaction between the at least one aldehyde and the at least one amide include controlling the pH or temperature of the acidic base fluid or encapsulating at least one of the aldehyde or the amide in a medium that prevents its interaction with the other component. For example, at least one of the aldehyde or amide can be encapsulated in a medium that dissolves or is hydrolyzed in the acidic base fluid.

In further embodiments in which the reaction between the at least one aldehyde and the at least one amide takes place in the corrosive environment, the at least one aldehyde can be formed in the corrosive environment from at least one aldehyde precursor. In such embodiments, the at least one aldehyde subsequently reacts to form the reaction product comprising the corrosion inhibitor composition. One of ordinary skill in the art will recognize that there can be certain advantages in forming the reaction product from at least one aldehyde precursor. For example, in some instances the at least one aldehyde can be unstable or have poor solubility that can limit its ability to form a reaction product with at least one amide. Illustrative aldehyde precursors suitable for forming an aldehyde in an acidic environment include, for example, a terminal alkyne, an alkynyl alcohol comprising a terminal alkyne, an acetal, a hemiacetal, a thioacetal, a thiohemiacetal, an aldehyde hydrate, a hydrazone, a semicarbazone, a thiosemicarbazone, an oxime, an imine and an enamine.

In some embodiments, the at least one aldehyde precursor comprises an alkynyl alcohol comprising a terminal alkyne. Some examples of such aldehyde precursors include without limitation, 2-methylbut-3-yn-2-ol, 1-pentyn-3-ol, 3-methyl-1-pentyn-3-ol, 1-hexyn-3-ol, 3-methyl-1-hexyn-3-ol, 5-decyn-4,7-diol, 3-butynyl alcohol and propargyl alcohol. Without being bound by theory or mechanism, Applicants believe that under the conditions of the present corrosive environment, the terminal alcohol becomes hydrated to form an enol, which subsequently tautomerizes to form an aldehyde at the terminal carbon. The aldehyde is then able to react with the amide under the acidic conditions of the corrosive environment to form a product that inhibits corrosion. In some embodiments, particularly those utilizing an alkynyl alcohol comprising a terminal alkyne, an additive such as, for example, hexamethylenetetramine (HMTA) or other formaldehyde source can be added to the corrosive environment. As noted in the experimental examples, inclusion of HMTA surprisingly enhances the corrosion inhibition properties of the reaction product.

The percentage of the reaction product in the present corrosion inhibitor compositions can vary over a wide range. In some embodiments, the product of a reaction between at least one aldehyde and at least one amide is present in the corrosion inhibitor composition in an amount ranging between about 1% and about 60% by weight of the corrosion inhibitor composition. In some embodiments, the product of a reaction between at least one aldehyde and at least one amide is between about 5% and about 60% by weight of the corrosion inhibitor composition. In some embodiments, the product of a reaction between at least one aldehyde and at least one amide is between about 5% and about 50% by weight of the corrosion inhibitor composition. In some embodiments, the product of a reaction between at least one aldehyde and at least one amide is between about 5% and about 40% by weight of the corrosion inhibitor composition. In some embodiments, the product of a reaction between at least one aldehyde and at least one amide is between about 5% and about 30% by weight of the corrosion inhibitor composition. In some embodiments, the product of a reaction between at least one aldehyde and at least one amide is between about 10% and about 50% by weight of the corrosion inhibitor composition. In some embodiments, the product of a reaction between at least one aldehyde and at least one amide is between about 10% and about 40% by weight of the corrosion inhibitor composition. In some embodiments, the product of a reaction between at least one aldehyde and at least one amide is between about 10% and about 30% by weight of the corrosion inhibitor composition. In some embodiments, the product of a reaction between at least one aldehyde and at least one amide is between about 10% and about 25% by weight of the corrosion inhibitor composition. In some embodiments, the product of a reaction between at least one aldehyde and at least one amide is between about 15% and about 30% by weight of the corrosion inhibitor composition. In some embodiments, the product of a reaction between at least one aldehyde and at least one amide is between about 15% and about 25% by weight of the corrosion inhibitor composition. One of ordinary skill in the art will be able to select concentrations of the at least one aldehyde and the at least one amide such that the reaction product between the two is formed in the corrosion inhibitor composition at any of the aforesaid concentration levels.

In some embodiments of the present invention, the corrosive environment comprises the acidic base fluid of a treatment fluid. Generally, the treatment fluids of the present invention comprise an aqueous phase base fluid, an acid, and a corrosion inhibitor composition comprising a product of a reaction between at least one aldehyde and at least one amide. The aqueous phase base fluids used in the treatment fluids of the present invention can comprise fresh water, saltwater (e.g., water containing one or more salts dissolved therein), brine, seawater, or combinations thereof. The water of the aqueous phase base fluid can come from any source, provided that it does not contain an excess of components that might undesirably affect the stability and/or performance of the treatment fluid. One of ordinary skill in the art, with the benefit of this disclosure, will recognize the types of components that might undesirably affect the stability and/or performance of the treatment fluids of the present invention.

In some embodiments, the aqueous phase base fluid can further comprise a co-solvent that is miscible with the aqueous phase base fluid. Addition of a co-solvent to the aqueous phase base fluid can aid incorporation of the corrosion inhibitor composition therein. Generally, the co-solvent is a water-miscible organic solvent such as, for example, methanol, ethanol, propanol, isopropanol, glycols (e.g., ethylene glycol and propylene glycol) and glycol ethers (e.g., ethylene glycol monomethyl ether, ethylene glycol dimethyl ether, ethylene glycol monoethyl ether, ethylene glycol diethyl ether, and ethylene glycol monobutyl ether) or the like.

The acids present in the treatment fluids of the present invention can include, but are not limited to, organic acids, mineral acids (e.g., hydrochloric acid, hydrofluoric acid, and the like), and mixtures of these acids. In some embodiments, the acid is hydrochloric acid. Additionally, a variety of weak acids (e.g., organic acids) can be used in accordance with embodiments of the present invention. Illustrative examples of suitable weak acids include, for example, formic acid, acetic acid, citric acid, glycolic acid, hydroxyacetic acid, lactic acid, hydrofluoric acid, 3-hydroxypropionic acid, carbonic acid, ethylenediaminetetraacetic acid, and mixtures of these acids. In various embodiments, the acid is present in the treatment fluid in an amount ranging between about 1% and about 37% by weight of the treatment fluid. In some embodiments, the acid is present in the treatment fluid in an amount ranging between about 5% and about 28% by weight of the treatment fluid. Factors that can dictate the chosen concentration of the acid in the treatment fluid include, for example, the desired purpose or use of the treatment fluid, the identity of the acid used and whether it is a strong or weak acid, the presence or absence of other components in the treatment fluid, and/or additional factors that will be recognized by one of ordinary skill in the art having the benefit of this disclosure.

In some embodiments, the corrosion inhibitor compositions of the present invention are present in the treatment fluid in an amount ranging from about 0.005% to about 5% by weight of the treatment fluid. In some embodiments, the corrosion inhibitor compositions are present in an amount ranging from about 0.1% to about 2% by weight of the treatment fluid. The amount of the corrosion inhibitor composition used in a treatment fluid can vary depending on conditions present at the metal's surface that is being protected, temperature, contact time, solubility of the corrosion inhibitor composition in the acidic base fluid, the acid strength, the chemical composition of the corrosion inhibitor, and other factors that will be evident to those of ordinary skill in the art having the benefits of this disclosure.

In some embodiments, treatment fluids of the present invention can further comprise additional components commonly used in treatment fluids and/or corrosion inhibitors. In some embodiments, an aqueous phase base fluid of the present treatment fluids can be emulsified with a non-aqueous fluid. The emulsion can be of the oil-in-water type or water-in-oil type. In some embodiments, the aqueous phase base fluid can be viscosified with an acid stable gelling agent, such as, for example, a polymer and an optional crosslinking agent. In some embodiments, the aqueous phase base fluid can be foamed. In some embodiments, additional components such as, for example, surfactants can be added to the aqueous phase base fluid. The treatment fluids of the present invention optionally can further include additives such as, for example, salts, scale inhibitors, organic corrosion inhibitors, catalysts, clay stabilizers, friction reducers, gases, foaming agents, iron control agents, solubilizers, pH adjusting agents (e.g., buffers), and the like. Combinations of these additives can be used as well. Those of ordinary skill in the art, with the benefit of this disclosure, will be able to determine the appropriate additives for a particular application and the benefits and advantages thereof.

In addition to the foregoing, the corrosion inhibition compositions of the present invention can further include additional components as well. Optional additional components of the corrosion inhibition compositions include, for example, intensifiers, dispersing agents, formic acid generating compounds, formaldehyde generating compounds, sources of copper ions, sources of iodide ions, aromatic hydrocarbons having high oil wetting characteristics, solvents and surfactants. Such additives can broaden the utility of the corrosion inhibiting compositions, enhance the effectiveness of the compositions and/or facilitate the use thereof. In some embodiments, the corrosion inhibitor compositions of the present invention can be combined with another corrosion inhibitor that is chemically compatible with those of the present invention. Additional disclosure regarding additives for corrosion inhibitor compositions and illustrative corrosion inhibitors are discussed in more detail in U.S. Pat. Nos. 5,697,443 and 5,591,381, the entire disclosures of which are hereby incorporated by reference.

To facilitate a better understanding of the present invention, the following examples of preferred embodiments are given. In no way should the following examples be read to limit, or to define, the scope of the invention.

EXAMPLES

Example 1

Figure 1:
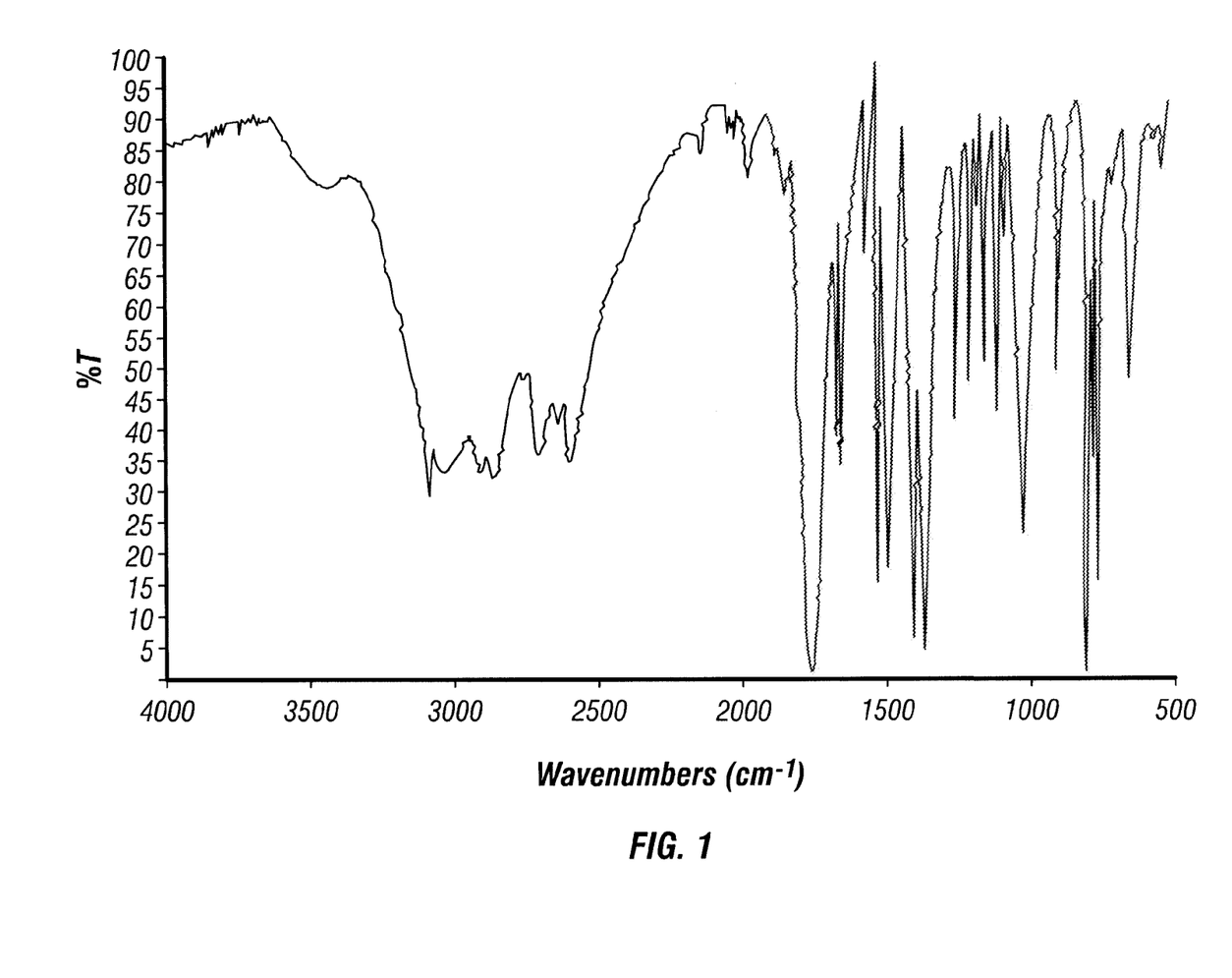
FIG. 1 shows an illustrative infrared spectrum of the product obtained from a reaction of benzamide with benzaldehyde in a 2:1 molar ratio in the presence of hydrochloric acid (KBr pellet).
Figure 2:
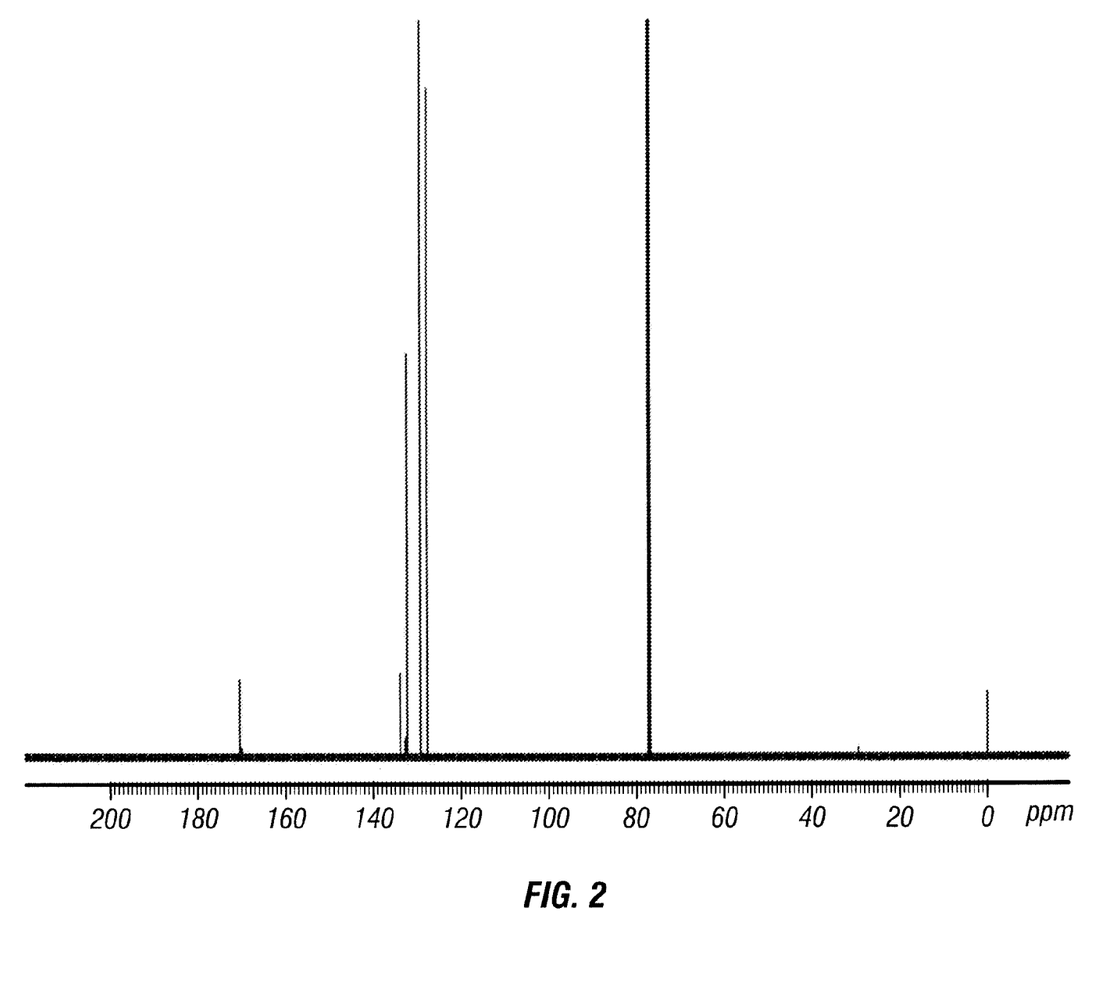
FIG. 2 shows a $^{13}$C nuclear magnetic resonance spectrum of benzamide in deuterochloroform.
Figure 3:
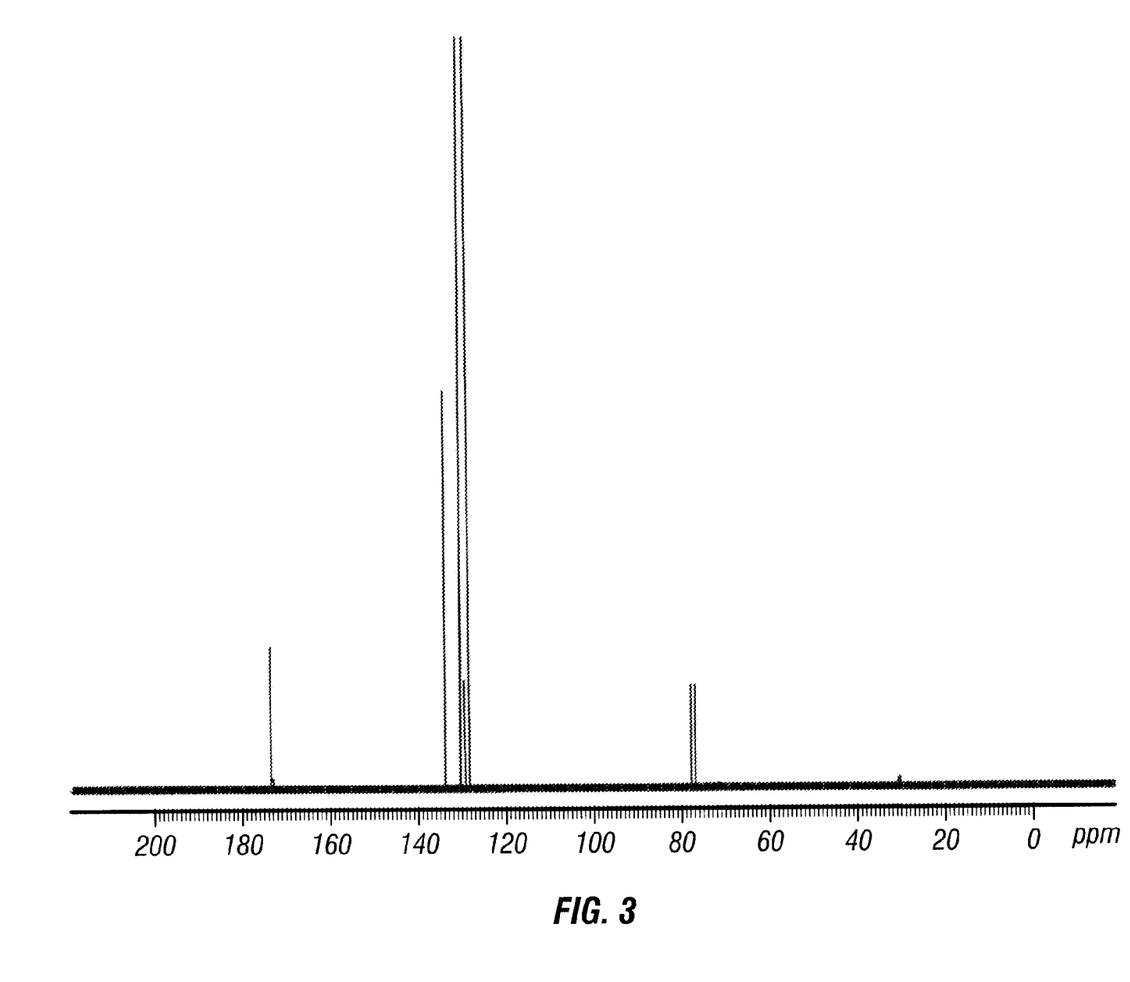
FIG. 3 shows an illustrative $^{13}$C nuclear magnetic resonance spectrum of the reaction product of benzaldehyde and benzamide.

Reaction Between Benzaldehyde and Benzamide. In a glass reaction vessel, 0.9 g benzaldehyde and 2.1 g benzamide were combined in 1:2 molar ratio in 100 mL 28% HCl and agitated until dissolved. The contents were placed in an autoclave, sealed and pressurized to 1000 psi with nitrogen. The autoclave was heated to 200° F. for 2 hours, and the contents were removed thereafter. The resulting solid was isolated and purified by recrystallization from dichloromethane. FIG. 1 shows an illustrative infrared spectrum of the reaction product. The most salient feature of the infrared spectrum is the substantial disappearance of the aldehyde carbonyl bands, indicating that a reaction with the benzamide took place. FIG. 2 shows a $^{13}$C nuclear magnetic resonance spectrum of benzamide in deuterochloroform. FIG. 3 shows an illustrative $^{13}$C nuclear magnetic resonance spectrum of the reaction product of benzaldehyde and benzamide. Comparing FIGS. 2 and 3, it is evident that a reaction took place.

Example 2

Corrosion Weight Loss Testing Using a Reaction Product Between Benzaldehyde and Benzamide as a Corrosion Inhibitor. Testing conditions and results for a 13Cr-L80 alloy specimen in a 28% HCl base fluid are summarized in Table 1. Weight loss tests were performed by first cleaning an alloy specimen of approximate surface area 4.4 in$^2$ by degreasing with acetone followed by removal of surface scale by lightly beadblasting the surface. The alloy specimen was then weighed and placed into 100 mL of a corrosion inhibitor testing fluid in a glass container. Testing fluids were prepared using the components indicated in Table 1, followed by addition of an appropriate amount of concentrated HCl to give the indicated acid concentration. "HAI-303" is a corrosion inhibitor containing a mixture of aldehydes that is commercially available from Halliburton Energy Services, Inc. The container holding the testing fluid and alloy specimen was placed in an autoclave. The autoclave was then closed, pressurized with nitrogen to 1000 psi and heated to the test temperature. The test duration was the total time of testing fluid contact with the alloy specimen. At the end of the testing period, the alloy specimen was removed from the testing fluid, cleaned with acetone and brushed lightly to remove surface deposits. Thereafter, the alloy specimen was dried and weighed.

TABLE 1

| HCl Conc (% w/v) | Test Duration (h) | Temperature (° F.) | HAI-303 (% v/v) | KI (% w/v) | Benzamide (% w/v) | Corrosion Loss (lb/ft$^2$) |
|---|---|---|---|---|---|---|
| 28 | 6 | 200 | 2 | 0.24 | 0 | 0.153 |
| 28 | 6 | 200 | 2 | 0.24 | 0.66 | 0.026 |

As indicated in Table 1, the inclusion of benzamide significantly improved the corrosion inhibition properties of an aldehyde-based corrosion inhibitor. Therefore, benzamide can be used as an intensifier to form a more potent corrosion inhibitor in situ in a corrosive environment.

Example 3

Corrosion Weight Loss Testing Using a Corrosion Inhibitor Formed From a Reaction Product Between Benzamide and an Aldehyde Formed From an Aldehyde Precursor. Testing fluid blends A and B were formulated as set forth in Table 2 by either shaking or stirring until a homogenous fluid was obtained. Corrosion weight loss testing was conducted as set forth in Example 2 using the blends formulated in Table 2. Table 3 shows the corrosion weight loss testing of blends A and B in the presence and the absence of benzamide.

TABLE 2

| Blend | MB$^a$ (% wt.) | Benzylidineaniline$^b$ (% wt.) | HMTA$^c$ (% wt.) | NaI (% wt.) | DEG$^d$ (% wt.) | IPA$^e$ (% wt.) |
|---|---|---|---|---|---|---|
| A | 0.16 | 0.12 | 0 | 0.008 | 0.075 | 0.637 |
| B | 0.16 | 0.12 | 0.03 | 0.008 | 0.045 | 0.637 |

$^a$MB = 2-methyl-3-butyn-2-ol
$^b$benzylidineaniline = condensation reaction product of aniline and benzaldehyde
$^c$HMTA = hexamethylenetetramine
$^d$DEG = diethyleneglycol
$^e$IPA = isopropanol

TABLE 3

| Blend | Blend Conc. in Testing Fluid (% v/v) | Benzamide (% w/v) | Corrosion Loss (lb/ft$^2$) |
|---|---|---|---|
| A | 0.6 | 0 | 1.42 |
| A | 0.6 | 0.75 | 0.805 |
| B | 0.6 | 0 | 0.060 |
| B | 0.6 | 0.75 | 0.019 |

As indicated in Table 3, the inclusion of benzamide again produced superior corrosion inhibition.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is the following:

1. A method comprising:
   providing a corrosive environment within a subterranean formation that comprises an acidic environment having a pH of 5 or below; and
   adding a composition comprising a corrosion inhibitor to the corrosive environment;
   wherein the corrosion inhibitor consists of a product of a reaction between at least one aldehyde and at least one amide that is not formamide or a formamide derivative.

2. The method of claim 1, wherein the at least one amide comprises a primary amide or a secondary amide.

3. The method of claim 2, wherein the at least one amide has a structure of wherein Z is O or S;
wherein $R_3$ is alkyl, trihaloalkyl, alkenyl, alkynyl, aryl, aralkyl, cycloalkyl, heterocyclyl, heteroaryl or heteroaralkyl; and
wherein $R_4$ and $R_5$ are independently hydrogen, alkyl, alkenyl, alkynyl, aryl, aralkyl, cycloalkyl, heterocyclyl, heteroaryl or heteroaralkyl, and wherein at least one of $R_4$ or $R_5$ is H.

4. The method of claim 3, wherein the at least one amide comprises at least one amide selected from the group consisting of acetamide, N-methylacetamide, trichloroacetamide, N-methyltrichloroacetamide, propanamide, N-methylpropanamide, butanamide, N-methylbutanamide, pentanamide, N-methylpentanamide, hexanamide, N-methylhexanamide, benzamide, N-methylbenzamide, 1-naphthylamide, N-methyl-1-naphthylamide, 2-naphthylamide, N-methyl-2-naphthylamide, o-toluamide, N-methyl-o-toluamide, m-toluamide, N-methyl-m-toluamide, p-toluamide, N-methyl-p-toluamide, thiobenzamide, 4-pyridinethioamide, ethionamide, pyrazine-2-thiocarboxamide, nicotinamide, stearamide, 2,2-diethoxyacetamide and lauric acid amide.

5. The method of claim 3, wherein $R_4$ and $R_5$ are H and Z is O.

6. The method of claim 2, wherein the at least one amide comprises at least one amide selected from the group consisting of benzamide, derivatives thereof, and combinations thereof.

7. The method of claim 1, wherein the at least one aldehyde has a structure of wherein $R_9$ is alkyl, alkenyl, alkynyl, aryl, aralkyl, cycloalkyl, heterocyclyl, heteroaryl or heteroaralkyl; and wherein X is $(CH_2)_n$, CH=CH, or C≡C;

wherein n is an integer ranging from 1 to about 10.

8. The method of claim 7, wherein the at least one aldehyde comprises at least one aldehyde selected from the group consisting of cinnamaldehyde, crotonaldehyde, benzaldehyde, phenylacetaldehyde, derivatives thereof and combinations thereof.

9. The method of claim 1, wherein the at least one aldehyde comprises at least one aldehyde selected from the group consisting of benzaldehyde, cinnamaldehyde, derivatives thereof, and combinations thereof.

10. The method of claim 9, wherein the at least one amide comprises at least one amide selected from the group consisting of benzamide, derivatives thereof, and combinations thereof.

11. A method comprising:
providing a corrosive environment having a pH of less than about 5;
adding a composition comprising at least one aldehyde precursor and at least one amide to the corrosive environment;
wherein the at least one amide is not formamide or a formamide derivative; and
wherein the at least one aldehyde precursor forms at least one aldehyde in the corrosive environment;
reacting the at least one aldehyde and the at least one amide in the corrosive environment to form a product that consists of the at least one aldehyde and at least one amide and that inhibits corrosion; and
exposing the product that inhibits corrosion to a metal surface in the corrosive environment.

12. The method of claim 11, wherein the corrosive environment is located in a subterranean formation.

13. The method of claim 11, wherein the at least one aldehyde precursor comprises at least one precursor selected from the group consisting of a terminal alkyne, an alkynyl alcohol comprising a terminal alkyne, an acetal, a hemiacetal, a thioacetal, a thiohemiacetal, an aldehyde hydrate, a hydrazone, a semicarbazone, a thiosemicarbazone, an oxime, an imine, and an enamine.

14. The method of claim 11, wherein the at least one aldehyde precursor comprises an alkynyl alcohol comprising a terminal alkyne;
wherein the terminal alkyne reacts in the corrosive environment to form the at least one aldehyde.

15. The method of claim 11, wherein the at least one amide comprises at least one amide selected from the group consisting of benzamide, derivatives thereof, and combinations thereof.

16. A method comprising:
providing a corrosive environment having a pH of less than about 5;
adding a composition comprising at least one aldehyde and at least one amide to the corrosive environment;
wherein the at least one amide is not formamide or a formamide derivative;
reacting the at least one aldehyde and the at least one amide in the corrosive environment to form a product that consists of the at least one aldehyde and at least one amide and that inhibits corrosion; and
exposing the product that inhibits corrosion to a metal surface in the corrosive environment.

17. The method of claim 16, wherein the corrosive environment is located in a subterranean formation.

18. The method of claim 16, wherein the at least one amide comprises at least one amide selected from the group consisting of benzamide, derivatives thereof, and combinations thereof.

* * * * *